United States Patent

[11] 3,549,822

[72] Inventor Joseph Chupity
Mountain View, Calif.
[21] Appl. No. 688,744
[22] Filed Dec. 7, 1967
[45] Patented Dec. 22, 1970
[73] Assignee Ampex Corporation
Redwood City, Calif.
a corporation of California

[54] MAGNETIC HEAD TRANSDUCER HAVING A PAIR OF SEPARATE SPACED NONMAGNETIC GAPS
14 Claims, 5 Drawing Figs.

[52] U.S. Cl. .......... 179/100.2, 178/6.6; 340/174.1
[51] Int. Cl. .......... G11b 5/22, G11b 5/28
[50] Field of Search .......... 340/174.1F; 346/74MC; 179/100.2C, 100.2D; 178/6.6DO

[56] References Cited

UNITED STATES PATENTS

| | | | |
|---|---|---|---|
| 2,431,540 | 11/1947 | Camras | 179/100.2 |
| 2,561,338 | 7/1951 | Camras | 179/100.2 |
| 2,649,506 | 8/1953 | Gayford et al. | 179/100.2 |
| 2,885,488 | 5/1959 | Andrews | 179/100.2 |
| 3,114,011 | 12/1963 | Shirakura | 179/100.2 |
| 3,243,521 | 3/1966 | Lock | 179/100.2 |

*Primary Examiner*—Bernard Konick
*Assistant Examiner*—Robert S. Tupper
*Attorney*—Robert G. Clay

ABSTRACT: A magnetic transducer for a magnetic recorder/reproducer, the transducer having a pair of separate spaced nonmagnetic gaps for simultaneous and redundant processing of a signal to be recorded on or reproduced from dual tracks of a magnetic medium. The transducer carries an energizing coil means such that during recording each gap is subjected to the common signal and during the reproduce mode summation of the sensed signals occurs at the head.

INVENTOR.
JOESEPH CHUPITY

BY Thomas E. Schatzel
ATTORNEY

INVENTOR.
JOESEPH CHUPITY

BY Thomas C. Schatzel
ATTORNEY

MAGNETIC HEAD TRANSDUCER HAVING A PAIR OF SEPARATE SPACED NONMAGNETIC GAPS

BACKGROUND OF THE INVENTION

The present invention relates to a magnetic transducer for magnetic recording and playback systems and more particularly to a magnetic transducer adapted for dual-channel redundant recording.

In the magnetic tape recorder/reproducer art, errors and loss of data in the recording and reproducing of electrical signals to or from magnetic patterns on the tape frequently arise due to tape dropouts. These dropouts may be the result of tape imperfections such as oxide voids incurred in the tape at the time of manufacturer, scratches incurred when the tape was in the manufacturing process or after receipt by the customer, crinkling or other mishandling of the tape, scratches or dirt on the tape. Dropout errors can be minimized to a low order by preselecting the tape for a minimum of oxide voids and exercising normal precautions in the handling and use of the tape. However, in certain applications it is desirable that the dropout errors be reduced to the extent that they are virtually nonexistent. For example, in the processing of digital data on magnetic tape with an extremely low error rate such as one in one billion bits, the dropout errors must be held to a considerably lower order than is obtainable by preselection and careful handling of presently commercially available tape.

One satisfactory means for realizing low dropout rates is redundant recording of the same signal on dual tracks of a magnetic tape. The probability is remote that dropouts will occur simultaneously at any two randomly chosen points on a magnetic tape provided the distance between these points is greater than the size of the dropouts. A prior art method and system has been to simultaneously process the signal in separate electronic channels and apply the same signal to dual, spaced tracks on a magnetic tape. This system utilizes separate heads and associated electronics for each channel. In the reproduce mode the signals from the two tracks are each sensed, processed in separate electronic channels and then added together. If a dropout occurs the level of the summation signal is merely halved. However, this requires that for each signal there be two separate transducers and associated channels of electronics overall doubling the number of transducer heads and electronics. Obviously, reliability, costs and space pose limitations.

SUMMARY OF THE INVENTION

The present invention provides a magnetic transducer that performs the function of the redundant two-channel recorder. The single head simultaneously handles two adjacent tracks with redundant information. The head carries a pair of core members with a pole member intermediate. The pole forms a nonmagnetic gap with each core such that the gaps are spaced apart longitudinally across the head face. The gaps are recessed or notched from opposite lateral edges and thus laterally spaced apart such that one gap does not process data associated with the other gap. The cores each carry an energizing coil which are coupled together. Thus, when recording, the common signal provides similar fluxes at each gap and redundant channels are recorded on the magnetic recording medium passed adjacent thereto. In the reproduce mode, each gap simultaneously senses the redundant signal and the coil arrangement allows for summing at the head. Thus, only if two voids simultaneously occur will there not be an output, and as previously noted, the probability of such a happenstance is extremely low.

The present transducer has proven to provide high reliability with wideband transverse recording techniques, in which the transducer is mounted on a rotary head assembly and caused to scan at high speeds transversely across a longitudinally moving tape. The spaced apart gaps result in two parallel spaced transverse tracks with redundant information. The gaps are spaced transversely a distance coinciding with the guard band and the breadth of the gaps coincide with the desired track width. The spacing between the gaps is selected such that the gaps are spaced apart a distance greater than the normal size of a dropout spot. A data processing method and system for space diversity redundant recording using a single electronic channel is disclosed in copending application Ser. No. 695,542 by Gerald A. Kluge. The present invention provides a transducer which may replace the two transducers illustrated therein.

DESCRIPTION OF THE PREFERRED EMBODIMENTS

Figure 1:
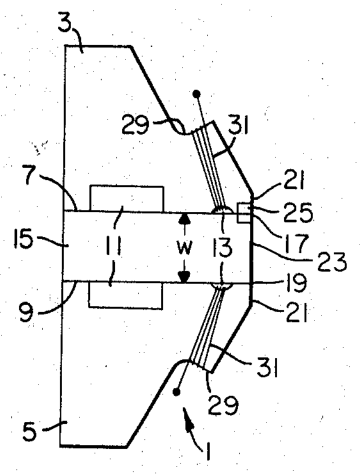
FIG. 1 is a side view of an individual magnetic transducer in accord with the present invention.
Figure 2:
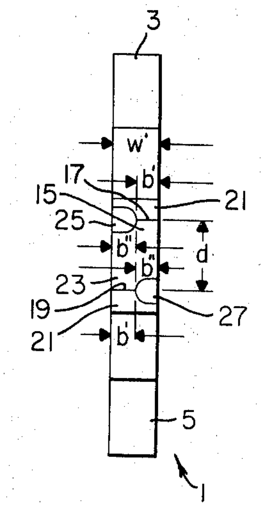
FIG. 2 is a top view of the transducer of FIG. 1.

Referring to FIGS. 1 and 2, there is illustrated an enlarged side and top view of a magnetic transducer in accordance with the present invention and referred to by the general reference character 1. The transducer 1 is illustrated in the form in which it has been reduced to practice for incorporation with a transverse rotary head wideband magnetic tape recorder/reproducer. Such recorders/reproducers are widely used in video recording and have gained wide acceptance in the recording of wideband analogue and PCM data. Furthermore, they have demonstrated to be highly feasible for recording digital data with high packing densities and reliability. However, it will be appreciated that the invention is not so limited in its application and may be utilized for recording with stationary head assemblies and on magnetic media other than tape.

The assembly 1 includes a pair of flat complementary core halves 3 and 5 comprised of a magnetic high frequency material such as Alfesil, ferrite or other magnetic material. Each core half 3 and 5 has a pole member receiving surface 7 and 9, respectively. Along each of the surfaces 7 and 9 is an aperture 11 and notch 13 both of which open on the surfaces 7 and 9. Intermediate the core halves 3 and 5 and abutting the receiving surfaces 7 and 9 is a common pole member 15. The pole member 15 and core half 3 form a first magnetic circuit with a nonmagnetic transduction gap 17. A second magnetic circuit with a nonmagnetic transduction gap 19 is formed by the pole member 15 and core half 5. The gap material of the gaps 17 and 19 may be any of several commonly used nonmagnetic materials, e.g. silicon monoxide. The width of the gaps 17 and 19 is a factor in signal wavelengths and is selected in accordance therefor. Generally, for wideband systems the gap width is in the order of one-half to one micron depending on the frequency. The apertures 11 facing the pole member 15 may be filled with a brazing material to rigidly secure the halves 3 and 5 to the pole member 15.

The breadth of the nonmagnetic gaps is substantially less than the width of the core halves 3 and 5 or the pole member 15. Referring to the surfaces adapted for adjacent or intimate contact with the magnetic record medium as the tip surfaces, the core halves each have a tip surface 21 and the pole member a tip surface 23. The gaps 17 and 19 are each recessed or notched from the longitudinal edge of the tip surfaces. The gap 17 is adjacent a recess 25 and the gap 19 is adjacent a recess 27. The recesses 25 and 27 open onto opposite longitudinal edges of the tip surfaces 21 and 23. As will subsequently become more evident, the degree of indentation $b''$ of the recesses 25 and 27 is selected so as to make the breadth $b'$ of the adjacent gap approximately equal to the desired track width to be laid down on a recording medium passing adjacent to the gaps. By having the recesses open from opposite longitudinal edges, the gaps 17 and 19 are transversely offset with relationship to each other. In fact, in the illustrated embodiment the recess 25 and 27 each extend beyond the longitudinal midaxis of the associated core and pole members such that there is a guard band (equal to $b''-b'$) intermediate the tracks. Also, the width W of the core member 15 is selected such that the longitudinal distance $d$ between the gaps 17 and 19 is greater than the expected width of the potential dropouts on the record medium. For example, it has been found that on standard commercially available recording tape the diametrical dimension of dropouts does not on an average exceed approximately 40 mils. Thus, by selecting pole member 15 with a width W of approximately 50 mils about the gaps, there is a margin of safety to avoid a dropout from overlapping both gaps.

Seated within the inner notch 13 and extending to an external notch 29 of each core half 3 and 5 is an energizing coil 31. In FIG. 1, the coils 31 are shown as series coupled and substantially parallel with the tip surfaces. The coils 31 are preferably placed close to the gaps 17 and 19 which is the region of maximum reluctance. By so placing the coils a close magnetic coupling to the gaps is realized achieving minimal inductance. This places the windings in the high reluctance region and close to the gaps 17 and 19. The close magnetic coupling between the windings 31 and the gaps ensures adequate magnetization even though the head power is reduced. The terminals of the energizing coils 31 extend to a common channel of processing electronics (not shown). For example, as illustrated in more detail in FIG. 3 in which the transducer 1 is mounted on a rotary drum 33 of a wideband transverse recorder, the energizing coils 31 may be received by a rotary transformer extending to common processing electronics. During recording, an electrical signal to be recorded is delivered by the processing electronics to the coils 31 through the rotary transformers. The signal is transduced to a fringing flux at the gaps 17 and 19. The fringing flux intersects the adjacent recording medium and a magnetic signal is recorded. Due to the fact that both coils are subjected to the same signal the information is redundantly recorded on the magnetic medium on two tracks. During reproducing the recording medium is passed adjacent to the gaps 17 and 19. A fringing flux is established at each gap 17 and 19 and redundant signals are generated within the energizing coils 31 and summed. Thus, the processing electronics receives the "double" signal. If a dropout appears at either gap, the processing electronics still receives a signal though it is 6 decibels less than the double signal. Assuming that the system is an FM system, which is the common method in wideband recording, the 6 decibel drop is of no consequence since subsequent demodulator and limiter stages remove the amplitude modulation. A 6 decibel reduction in signal results in an insignificant reduction in the systems signal-to-noise ratio. Only if dropouts simultaneously appear at both gaps will the signal be adversely affected. As previously, mentioned, the likelihood of simultaneous dropouts occurring is highly remote. Though the coils 31 are illustrated as connected in series, they may also be connected in parallel. Whether the coils are connected commonly in series or parallel depends upon the impedance which is a factor of the signal frequency. With series connection less current is required but there is higher impedance and thus need more voltage than when the windings are connected in parallel. If the frequency is high then the required driving voltage is high since the voltage and frequency are relatively proportional.

Figure 3:
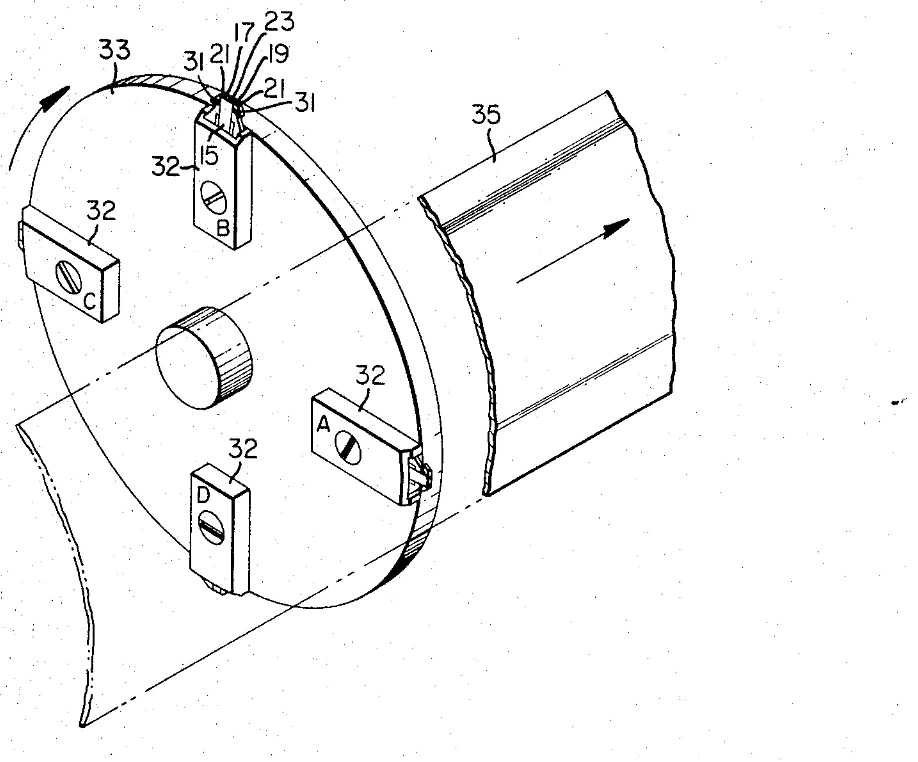
FIG. 3 diagrammatically illustrates a mounting of four transducers of FIG. 1 on a transverse rotary head assembly for a wideband magnetic tape recorder/reproducer.

In FIG. 3, the transducers are illustrated as supported by support members 32 mounted on the rotary drum 33 of a two-channel, wideband recorder/reproducer. In such systems, as is well known in the art, the drum rotates moving the transducers 1 transversely across a slowly moving tape 35. The support members are so mounted that the four individual transducers 1 protrude slightly past the periphery of the drum. The tape 35 moves longitudinally normal to the drum direction to provide a head-to-tape velocity much greater than the tape velocity. As shown, four transducers 1 are located 90° apart along the periphery of the drum so that each transducer is in contact a substantial part of the rotation. For example, with a 2-inch tape the drum may be selected so that each transducer is in contact for approximately 120° of rotation. It may be noted that the tape 35 is cupped about the head drum so that intimate head-to-tape contact is assured.

Figure 4:
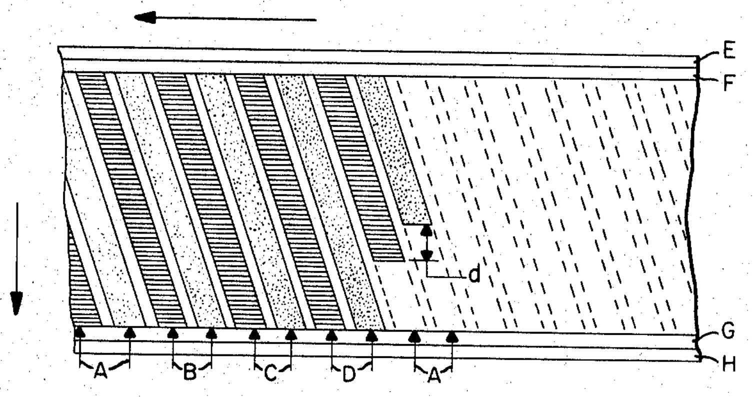
FIG. 4 illustrates an enlarged view of a tape segment recorded with a head assembly of FIG. 3.

FIG. 4 illustrates a fragment of the recording pattern of a two-channel recorded tape associated with a rotary head assembly according to FIG. 3. Each head assembly designated A, B, C, and D records two redundant tracks of information. The spacing between redundant tracks is dependent upon the relationship of the dimensions $b'$ and $b''$ across the tip surfaces and notches. The width of the tracks is dependent upon the breadth $b'$ of the gaps. The tracks are at an angle across the tape segment since the tape is simultaneously traveling normal to the direction of rotation. It may be noted that the transverse distance between redundant points coincides with the distance $d$ between the gaps. For completeness, the tape segment is shown as carrying auxiliary longitudinal tracks E, F, G and H which are commonly associated with longitudinal head members, e.g., audio information, control signals, etc.

Figure 5:
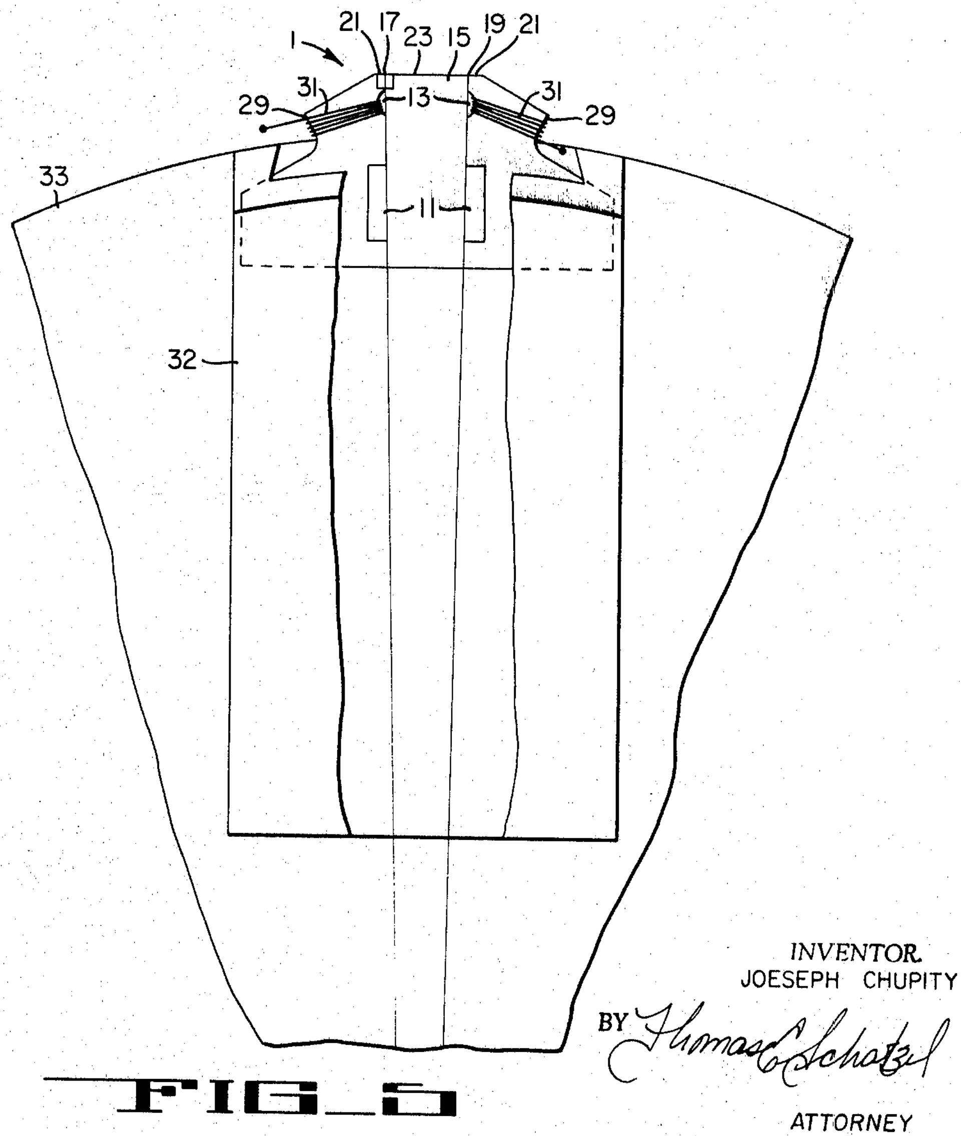
FIG. 5 shows an alternate embodiment of the head transducer of the present invention and mounted on a transverse rotary head assembly for a wideband magnetic tape recorder/reproducer and in which the core member is tapered.

FIG. 5 illustrates a further modified version of the transducer 1. In FIG. 5 an enlarged view of a segment of the rotary drum 33 carrying a transducer according to the present invention is illustrated. The reference numerals are common to those of FIGS. 1, 2 and 3. However, the pole member 15 is tapered such that its surface intimate with the pole member receiving surfaces 7 and 9 of the core halves 3 and 5 coincide with the radius path of the drum 33 when they are extended as illustrated. Also, the pole member receiving surfaces 7 and 9 of the core halves 3 and 5 are also tapered to coincide with the pole member 15. It has been found that without tapering the spacing between recorded tracks on the recording medium varies as the core halves 3 and 5 and the pole member 15 wear due to the frictional contact with the tape. Thus, unless the recorded medium is reproduced by the same recorder/reproducer, and carrying the same transducers 1 and without more wear, the reproduced signal is likely to be distorted. It has been found that by tapering the nonmagnetic record gap in the depth direction to coincide with the radius of the drum, the spacing between tracks remains constant. The recorded medium can then be reproduced by another head assembly or even another recorder/reproducer without a loss in fidelity or accuracy.

In viewing the embodiments of the invention as illustrated for use on a wideband recorder/reproducer it should be appreciated that the head 1 is extremely small. Illustrative of the small size, for recording tracks of 5 mils in width and guard bands of 2½ mils, the width W' (see FIG. 2) of the core halves 3 and 5 and pole member 15 about the tip surfaces 21 and 23 is approximately 12½ mils. The breadth $b'$ of the gaps 17 and 19 is approximately 5 mils such that the breadth $b''$ of the recesses 25 and 27 is approximately 7½ mils. The width $d$ of the pole member 15 about the tip surface is generally in the order of 50 mils. This, as previously mentioned, is larger than the general size of the dropouts which may occur. The depth of the recesses 25 and 27 may be selected to terminate at or slightly above the inner notch 13 receiving the energizing coils 31. Transducers according to these dimensions have resulted in digital data reliability in excess of $10^9$ using commercially available magnetic tape.

I claim:

1. A magnetic transducer for transduction of signals in cooperation with a pair of spaced apart adjacent tracks along a magnetic recording medium, the adjacent tracks of selected widths and spaced apart a selected distance to define therebetween a guard band of a selected width without recorded signals comprising:

a pair of complementary magnetic core halves each defining a tip surface for positioning adjacent to the recording medium during transduction of signals, the width of each of the core halves at its tip surface being equal to at least the combined widths of adjacent tracks and the guard band therebetween;

a pole member intermediate the core halves defining a tip surface for positioning adjacent to the recording medium during transduction of signals, the pole member separated from the core halves at its tip surface to form a nonmagnetic gap with each core half and define a pair of separate magnetic paths sharing said pole member, the width of the tip surface of the pole member equal to the width of the tip surfaces of the core halves, the tip surfaces of the pole member and core halves being notched at the gaps to reduce the breadth of the associated gap in the direction of the width dimension of the tip surfaces to approximately equal the width of one track, the notch at one gap provided at an end thereof opposite the end of the other gap at which the other notch is provided;

energizing coil means associated with the magnetic paths for transduction of signals therewith; and means for mounting the magnetic transducer for transduction of signals in cooperation with the recording medium with the transducer gaps positioned to transduce signals with different ones of the pair of spaced-apart tracks along the recording medium.

2. The transducer according to claim 1 wherein the energizing coil means includes two sets of windings, each core half includes means for supporting one set of the windings thereon for transduction of signals with the magnetic path defined by the core half, and the windings of the sets coupled together for connecting to the same processing electronics.

3. The transducer according to claim 2 wherein the sets of windings are connected in series.

4. The transducer according to claim 2 wherein the sets of windings are connected in parallel.

5. The transducer according to claim 1 wherein the dimension of the pole member at its tip surface in the direction in which the recording medium moves past the tip surface defines an intergap spacing greater than approximately 40 mils.

6. The transducer according to claim 1 wherein each core half has a pole member receiving surface intersecting its tip surface, the pole member nested between the pole member receiving surfaces to close the magnetic paths, each of the core members defines a notch opening on the pole member receiving surface immediately below the nonmagnetic gap formed by the notched core member, and the energizing coil means includes two sets of windings, one set of windings is seated in each notch opening on the pole member receiving surface to be supported by the associated core half.

7. The transducer according to claim 6 wherein the tip surfaces are rectangular with each having opposite lateral edges in the direction of its width and opposite longitudinal edges in the direction transverse of its width, and the notches at the gaps are provided at the opposite longitudinal edges of the tip surfaces.

8. The transducer according to claim 1 wherein each core half has a pole member receiving surface intersecting its tip surface, the pole member is nested between with surfaces confronting the pole member receiving surfaces to close the magnetic paths, and the pole member receiving surfaces of the core halves and the confronting surfaces of the pole member are tapered in the direction intersecting their tip surfaces.

9. The transducer according to claim 8 for use with a rotary assembly which rotates the transducer to have its tip surfaces follow a circular path of a predetermined radius for transduction of signals in cooperation with a magnetic recording medium wherein the pole member receiving surfaces of the core halves and the confronting surfaces of the pole member are tapered to coincide with the radius path of the circular path.

10. A magnetic transducer assembly of a rotary scan recorder/reproducer for transduction of signals in cooperation with a pair of spaced apart adjacent tracks extending across the width of a magnetic tape, the adjacent tracks of selected widths and spaced a selected distance to define therebetween a guard band of a selected width without recorded signals comprising:

a. a magnetic transducer having:

1. a pair of complementary core halves each having a tip surface for positioning adjacent to the magnetic tape during transduction of signals, the width of each of the core halves at its tip surface being equal to at least the combined widths of adjacent tracks and the guard band therebetween;

2. a pole member intermediate the core halves defining a tip surface for positioning adjacent to the magnetic tape during transduction of signals, the pole member separated from the core halves at its tip surface to form a nonmagnetic gap with each core half and defined a pair of separate magnetic paths sharing said pole member, the width of the tip surface of the pole member equal to the width of the tip surfaces of the core halves, the tip surfaces of the pole member and core halves being notched at the gaps to reduce the breadth of the associated gap in the direction of the width dimension of the tip surfaces to equal approximately the width of one track, the notch at one gap provided at an end thereof opposite the end of the other gap at which the other notch is provided; and 3. energizing coil means associated with the magnetic paths for transduction of signals therewith;

b. a rotatable body; and c. mounting means for affixing the magnetic transducer to the rotatable body to be rotated thereby to have the tip surfaces of the magnetic transducer follow a circular path of a predetermined radius for transduction of signals in cooperation with the magnetic tape with the transducer gaps positioned to transduce signals with different ones of the pair of spaced-apart tracks along the magnetic tape.

11. The magnetic transducer assembly according to claim 10 wherein each core half of the magnetic transducer has a pole member receiving surface intersecting its tip surface, the pole member is nested between the surfaces confronting the pole member receiving surfaces to close the magnetic paths, and the pole member receiving surfaces of the core halves and the confronting surfaces of the pole member tapered in the direction intersecting their tip surfaces.

12. The magnetic transducer assembly according to claim 11 wherein the pole member receiving surfaces of the core halves and the confronting surfaces of the pole member are tapered to coincide with the radius path of the circular path.

13. The magnetic transducer assembly according to claim 11 wherein the rotatable body is circular having a predetermined radius, the magnetic transducer is affixed to the circular body at a location of its periphery with its tip surfaces extending radially outward of the circular body beyond the periphery, and the pole member receiving surfaces of the core halves and the confronting surfaces of the pole member are tapered to coincide with the radius path of the circular body.

14. The magnetic transducer assembly according to claim 13 wherein the dimension of the pole member at its tip surface in the direction in which the tape moves past the tip surface defines an intergap spacing greater than approximately 40 mils.